(12) United States Patent
Yonemori et al.

(10) Patent No.: US 7,677,342 B2
(45) Date of Patent: Mar. 16, 2010

(54) HYBRID SYSTEM OF VEHICLE

(75) Inventors: Kei Yonemori, Hiroshima (JP); Nobuhide Seo, Hiroshima (JP)

(73) Assignee: Mazda Motor Corporation (JP)

( * ) Notice: Subject to any disclaimer, the term of this patent is extended or adjusted under 35 U.S.C. 154(b) by 307 days.

(21) Appl. No.: 11/703,078

(22) Filed: Feb. 7, 2007

(65) Prior Publication Data

US 2007/0227792 A1 Oct. 4, 2007

(30) Foreign Application Priority Data

Mar. 31, 2006 (JP) .............................. 2006-098221

(51) Int. Cl.
*B60W 10/04* (2006.01)
(52) U.S. Cl. ............................ 180/65.285; 180/65.256; 180/65.275; 180/65.31
(58) Field of Classification Search ................ 180/65.1, 180/65.2, 65.4, 65.6; 903/902, 903, 925, 903/930, 940, 941, 942
See application file for complete search history.

(56) References Cited

U.S. PATENT DOCUMENTS

| | | | |
|---|---|---|---|
| 3,205,699 A | * | 9/1965 | Van Assendelft ............. 374/16 |
| 6,452,286 B1 | * | 9/2002 | Kubo et al. ............... 290/40 C |
| 6,757,598 B2 | * | 6/2004 | Okoshi ........................ 701/22 |
| 2004/0060751 A1 | | 4/2004 | Frank |
| 2004/0254695 A1 | | 12/2004 | Komiyama et al. |
| 2006/0020383 A1 | * | 1/2006 | Betz et al. ...................... 701/50 |
| 2006/0021809 A1 | | 2/2006 | Xu et al. |

FOREIGN PATENT DOCUMENTS

JP 2005-033886 2/2005

OTHER PUBLICATIONS

European Search Report dated May 6, 2009; Application No./ Patent No. 07003169.5-2207/1859985.

* cited by examiner

*Primary Examiner*—Lesley Morris
*Assistant Examiner*—Bryan A Evans
(74) *Attorney, Agent, or Firm*—Studebaker & Brackett PC; Donald R. Studebaker

(57) ABSTRACT

Disclosed is a hybrid system of vehicle capable of accurately generating an engine output in conformity to a required vehicle driving power and suppressing an electric power loss even when a battery is used for correcting electric power to prevent occurrence of overshoot or undershoot. The hybrid system of vehicle is designed to drive a generator by an engine and supply an electric power generated by the generator directly to a wheel-driving electric motor so as to drive the motor. The hybrid system of vehicle comprises required motor output setting means for setting a required output of the motor depending on a required vehicle driving power, required generator output setting means for setting a required output of the generator depending on the required motor output set by the required motor output setting means, and engine output setting means for setting an output of the engine depending on the required generator output set by the required generator output setting means.

9 Claims, 6 Drawing Sheets

*Fig. 6A*
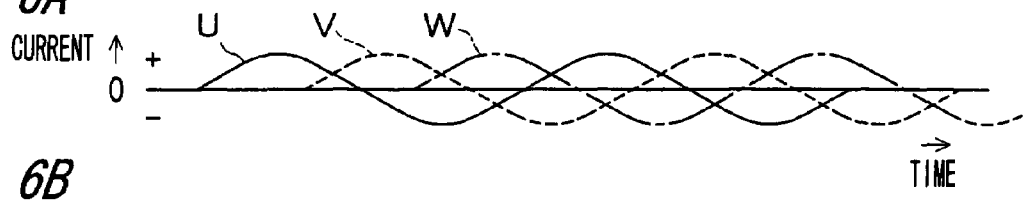
*Fig. 6B*
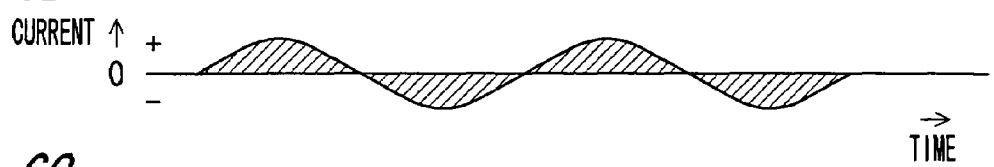
*Fig. 6C*
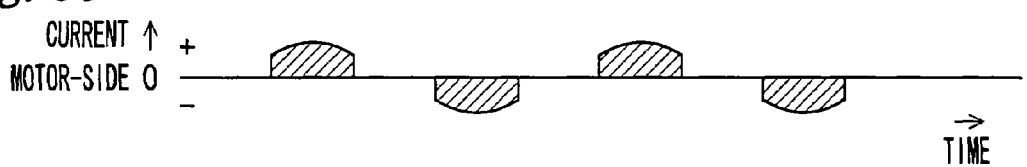
*Fig. 6D*
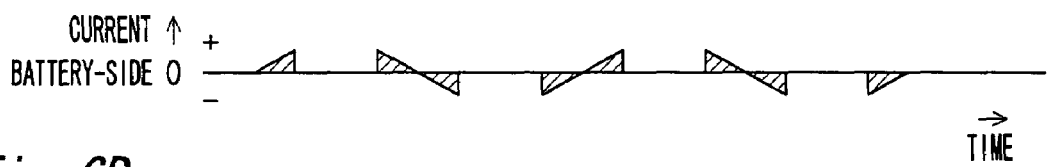
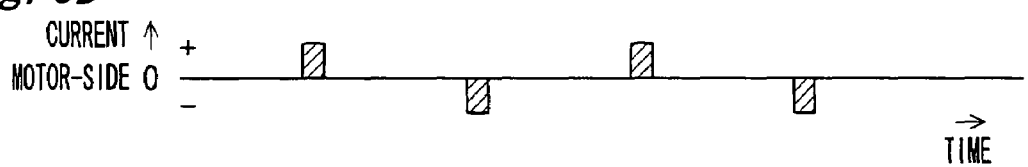
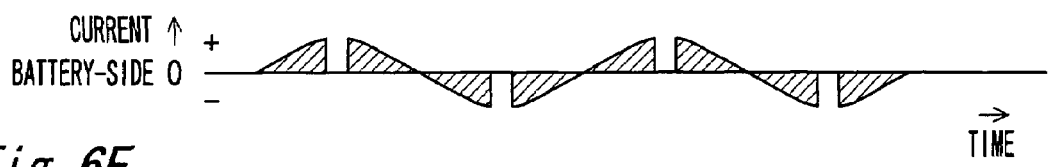
*Fig. 6E*
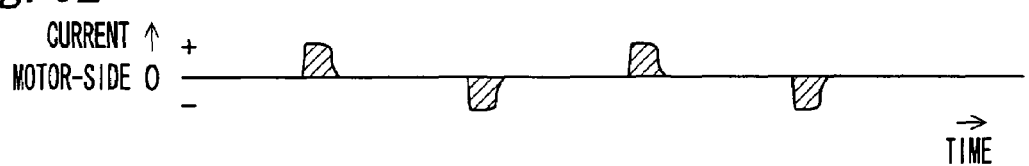
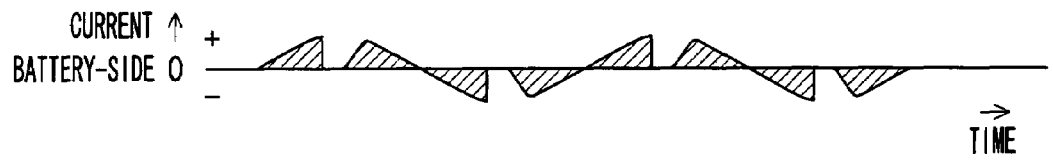

HYBRID SYSTEM OF VEHICLE

BACKGROUND OF THE INVENTION

1. Field of the Invention

The present invention relates to a hybrid system of vehicle designed to drive a generator by mechanical power of an engine and drive an electric motor by electric power generated by the generator.

2. Description of the Related Art

Heretofore, there has been known a hybrid system vehicle designed to be driven by an electric motor having a plurality of driving power sources, such as an engine, a generator and a battery, while controllably activating the driving power sources simultaneously or individually depending on conditions. For example, Japanese Patent Laid-Open Publication No. 2005-33886 discloses such a series type of hybrid system.

In a series type of hybrid system, an AC-DC inverter and a converter for voltage or frequency conversion are typically inserted between a generator/electric motor and a battery, and it is know that a relatively large electric power loss occurs during conversion processes therein.

Thus, there is the need for disusing the inverter and the converter. In reality, the series type of hybrid system includes a mode where electric power is supplied from a generator directly to an electric motor, and the disuse of the inverter and the converter without effective measures will cause difficulty in generating an output of an engine as a driving power source of the generator, fully in conformity to a required vehicle driving power determined by a depression amount of an accelerator pedal or a brake pedal operated by a driver, a vehicle speed, etc. If a desired accuracy in conformity is not ensured, overshoot (excess of generator output) or undershoot (deficiency of generator output) will occur to preclude a required driving torque from being adequately obtained.

Therefore, when the inverter and the converter are eliminated from the series type of hybrid system to suppress an electric power loss, it is necessary to accurately control an engine output as a driving power source of a generator in conformity to a required vehicle driving power without the need for correcting electric power by a battery.

SUMMARY OF THE INVENTION

In view of the above technical problem, it is an object of the present invention to provide a hybrid system of vehicle capable of accurately generating an output power of an engine in conformity to a required vehicle driving power while suppressing an electric power loss.

In order to achieve this object, in a first aspect of the present invention, there is provided a hybrid system of vehicle designed to drive a generator by an engine and supply an electric power generated by the generator directly to a wheel-driving electric motor so as to drive the motor. The hybrid system of vehicle comprises required motor output setting means for setting a required output of the motor depending on a required vehicle driving power, required generator output setting means for setting a required output of the generator depending on the required motor output set by the required motor output setting means, and engine output setting means for setting an output of the engine depending on the required generator output set by the required generator output setting means.

In the above hybrid system of the present invention, electric power generated by the generator can be supplied directly to the motor without interposing an inverter and a converter between the generator and the motor, so as to suppress an electric power loss due to the inverter and the converter. In addition, an engine output can be accurately generated in conformity to a required vehicle driving power to achieve stable vehicle running depending on the required vehicle driving power.

The above hybrid system of vehicle may further comprise target generator value setting means operable to set a target torque and a target speed of the generator, based on the required generator output set by the required generator output setting means, and wherein after setting a control line which is formed by connecting a part of respective intersection points between a plurality of required motor output lines each representing a change in the required motor output determined using a parameter consisting of a load of the motor, and a high engine efficiency region where a product of a thermal efficiency of the engine and a power generation efficiency of the generator becomes equal to or greater than a given value, in such a manner that each of an engine or generator speed and an equilibrating torque at which an engine torque is equilibrated with a generator torque, becomes higher as the required motor output is increased, the target torque and the target speed of the generator may be set based on the required generator output set by the required generator output setting means. In this hybrid system of vehicle, respective torques and speeds of the generator and the engine are set based on the control line on which each of the engine or generator speed and the equilibrating torque is increased in response to an increase in load of the motor. Thus, the respective outputs of the generator and the engine can be accurately generated in conformity to the required motor output.

Moreover, the target generator value setting means may be operable to select maximum efficiency points from respective intersection points between the plurality of required motor output lines and the high engine efficiency region, and connect the selected maximum efficiency points on equi-output lines consisting of the plurality of required motor output lines to form an envelope serving as the control line. This makes it possible to run the vehicle with a maximum fuel efficiency so as to achieve enhanced fuel economy.

Furthermore, the target generator value setting means may be operable to set the control line to have a portion where the target torque of the generator is rapidly reduced to zero as the engine or generator speed is lowered in a given engine or generator speed region less than those in the high engine efficiency region. Thus, in a low engine speed region where the engine is likely to have unstable combustion, the target torque of the generator is rapidly reduced to zero to allow the engine to be stopped so as to suppress deterioration in fuel economy. Further, during start of the engine, the entire torque generated by the engine can be consumed in increasing the speed of the generator to quickly activate the generator.

And yet, the target generator value setting means may be operable to set the control line to have a portion where the target torque of the generator is rapidly increased as the engine or generator speed is increased in a given equilibrating torque region greater than a maximum equilibrating torque in the high engine efficiency region. This makes it possible to prevent the engine and the generator from being operated at an excessively high speed so as to ensure reliability thereof.

In addition, the hybrid system of vehicle may further comprise a battery connected to the generator through an inverter and a converter in this order, first switching means for switching electrical connection between the generator and the battery, second switching means for switching electrical connection between the generator and the motor, and switching control means for controlling the first and second switching means to allow electric power to be supplied from the battery to the motor and to allow the battery to be charged by the generator. In this hybrid system of vehicle, the battery can adequately correct overshoot or undershoot which otherwise transiently occurs in the generator due to delay in response of change of the engine output since the generator output is controlled with the engine output.

Moreover, the switching control means may be operable, when the battery is charged by the generator, to control the first and second switching means in such a manner that the generator is connected to the battery within a given time period around a zero-crossing point along an AC waveform except for positive and negative peak regions in one AC cycle. In this hybrid system of vehicle, the first and second switching means are switched to connect the generator and the battery only in a low current region so as to charge the battery while suppressing deterioration in durability of contacts of the switching means.

Furthermore, the switching control means may be operable, when the electric power is supplied from the generator to the motor at a given value or more, to stop a switching operation of the first and second switching means. In this hybrid system of vehicle, during power supply in a large amount, for example, during high-speed vehicle running, the switching operation of the first and second switching means can be stopped to suppress deterioration in durability of the contacts of the switching means.

BRIEF DESCRIPTION OF THE DRAWINGS

FIG. 6A is a waveform chart showing a three-phase AC to be generated by the generator, wherein the three-phase AC consists of three sine-waves (U-wave, V-wave, W-wave) having a phase difference of $\pi/3$ with respect to each other.

FIG. 6B is a waveform chart showing the U-wave.

FIG. 6C is a waveform chart showing a first example of dividing the U-wave into two components for the motor and the battery.

FIG. 6D is a waveform chart showing a second example of dividing the U-wave into two components for the motor and the battery.

FIG. 6E is a waveform chart showing an example of dividing the U-wave by turning on/off the internal switch while maintaining the switching element in its ON state.

DESCRIPTION OF THE PREFERRED
EMBODIMENTS OF THE INVENTION

With reference to accompanying drawings, an embodiment of the present invention will now be described.

Figure 1:
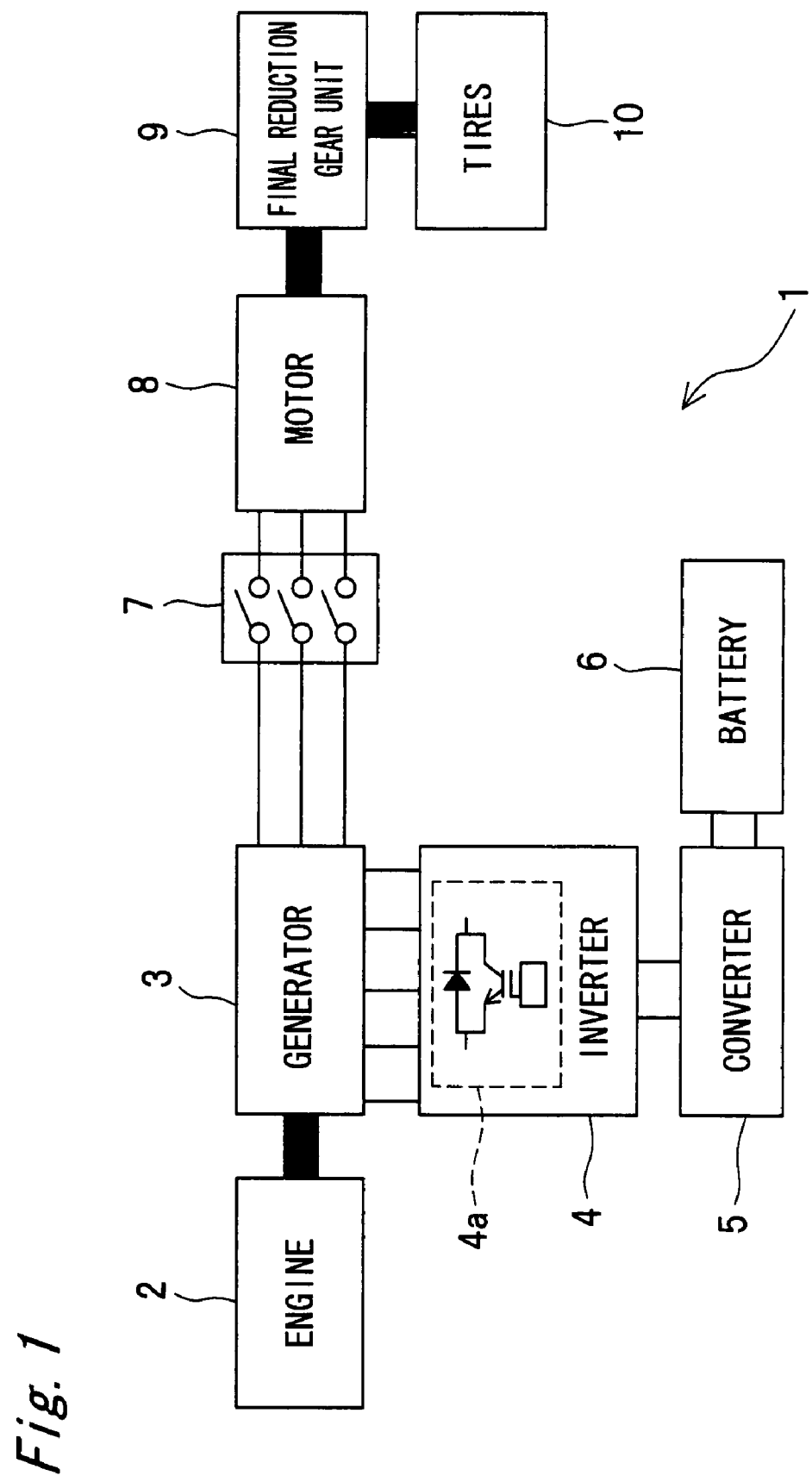
FIG. 1 is a block diagram showing a fundamental configuration of a hybrid system of vehicle according to one embodiment of the present invention.

FIG. 1 is a block diagram showing a fundamental configuration of a hybrid system of vehicle according to one embodiment of the present invention. This hybrid system of vehicle 1 is a direct series hybrid system of vehicle, which fundamentally comprises an engine 2, a generator 3 mechanically connected to the engine 2 and adapted to be driven by the engine 2, and an electric motor (hereinafter referred to simply as "motor") 8 electrically connected to the generator 3 and adapted to be driven based on an electric power generated by the generator 3. In this embodiment, the generator 3 is directly connected to the motor 8 through a switching element 7 (equivalent to "second switching means" set forth in the appended claims), and the motor 8 is fundamentally driven based an electric power which is directly supplied from the generator 3 when the switching element 7 is turned on. Any suitable type of switching element, such as a mechanical relay switch or a semiconductor switch, may be used as the switching element 7.

The generator 3 is operable to generate a three-phase AC power based on an output, i.e., mechanical power, of the engine 2. The generator 3 is connected to the motor 8 through the switching element 7 and further connected to a battery 6 through an inverter 4 and a converter 5 in this order. In a charge mode of the battery 6, an AC power from the generator 3 is converted to a DC power by the inverter 4, and then a voltage and a frequency of the DC power are changed by the converter 5. In a discharge mode of the battery 6, a voltage and a frequency of a DC power from the battery 6 are changed by the converter 5, and then the DC power is converted to an AC power by the inverter 4 in a reverse manner to that in the charge mode. The inverter 4 includes an internal switch 4a (equivalent to "first switching means" set forth in the appended claims) consisting of a semiconductor switch. The internal switch 4a is adapted to be tuned on/off so as to controllably transmit an electric power between the generator 3 and the battery 6.

The motor 8 is adapted to be driven based on a three-phase AC power to be supplied from the generator 3 and the battery 6. As is commonly known, the motor 8 is connected to a final reduction gear unit 9 consisting of a differential gear unit, and attached to tires 10 through an axle. For example, when a vehicle is decelerated during downhill running, the motor 8 generates a three-phase AC power (i.e., generates an electric power), and the generated electric power is supplied to the battery 6 through the inverter 4 and the converter 5 in this order and stored in the battery 6.

In the hybrid system of vehicle 1, under a normal vehicle running condition, an electric power generated by the generator 3 is directly supplied to the motor 8, as mentioned above. In particular, the hybrid system of vehicle 1 according to this embodiment is designed to be controlled such that an engine output is accurately generated in conformity to a required vehicle driving power. This direct series control will be specifically described below.

Figure 2:
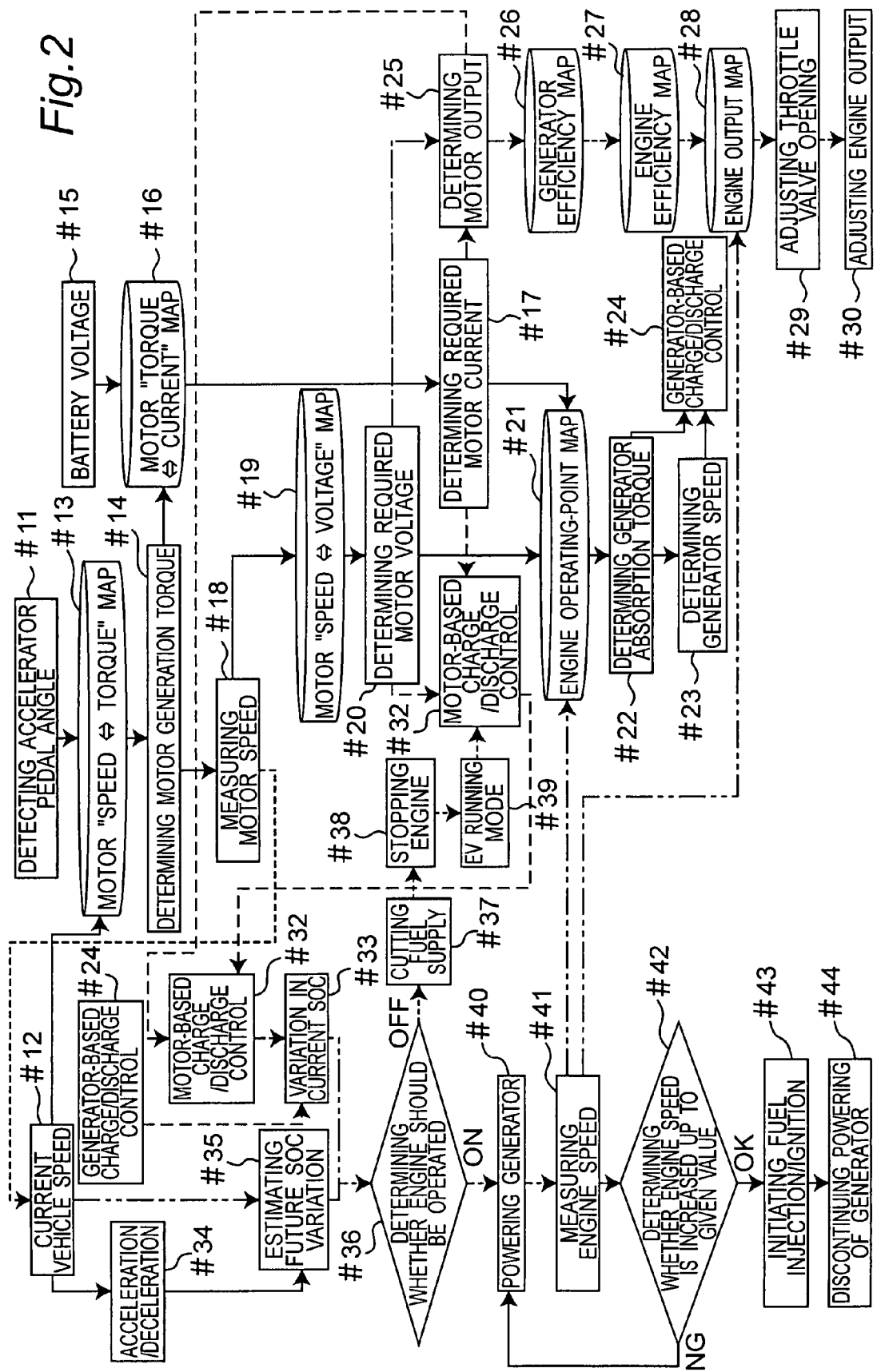
FIG. 2 is a flowchart showing a direct series control process for the hybrid system of vehicle.
Figure 3:
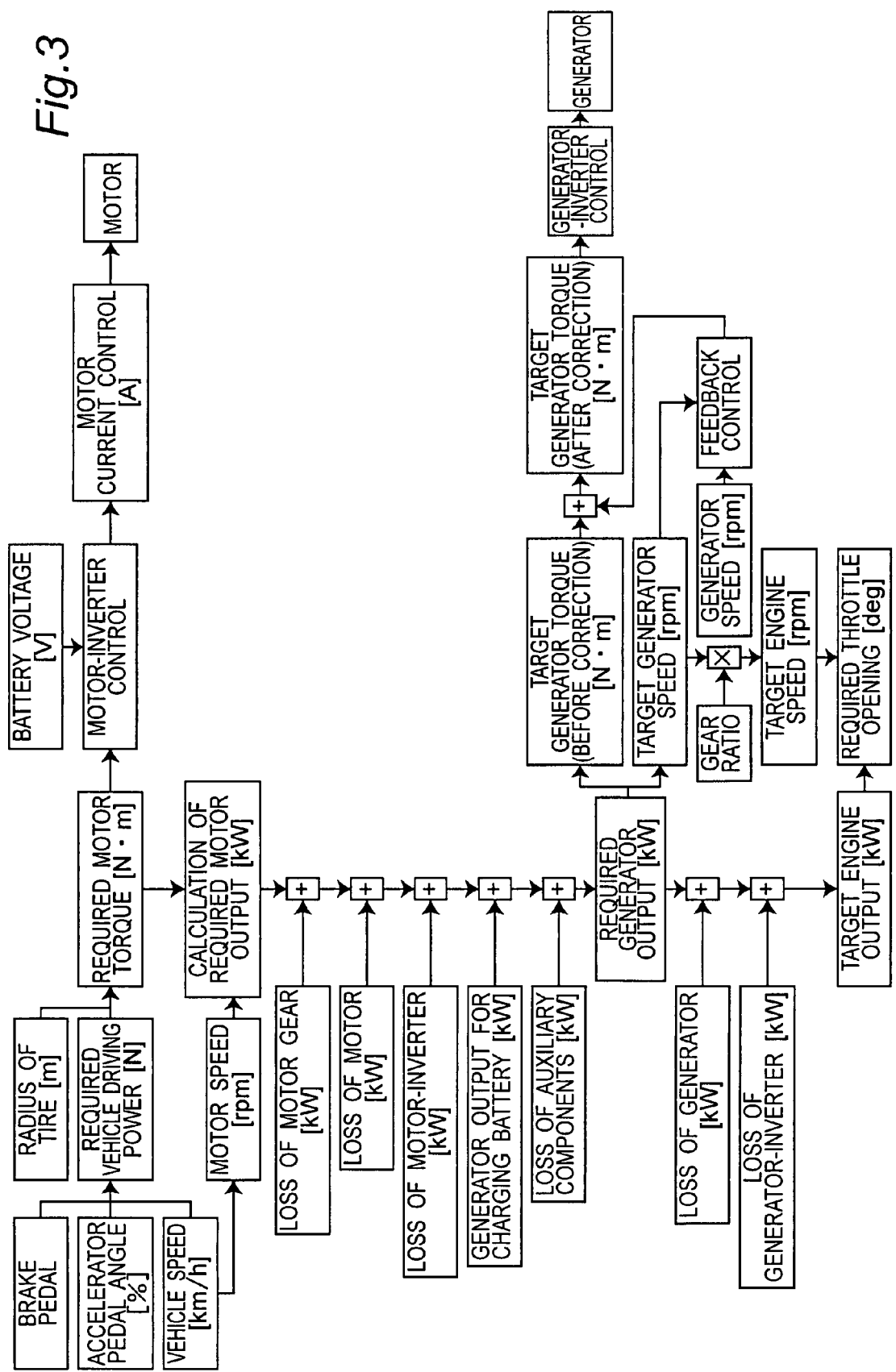
FIG. 3 is a block diagram specifically showing various parameters for use in the direct series control process.

Fundamentally, in this hybrid system of vehicle 1, a required output of the motor 8 is firstly set depending on a required vehicle driving power determined based on a vehicle speed and a depression amount of an accelerator pedal or a brake pedal operated by a driver. A required output of the generator 3 is then set depending on the required output of the motor 8, and an output of the engine 2 is finally set depending on the required output of the generator 3. FIG. 2 is a flowchart showing a direct series control process for the hybrid system of vehicle 1 designed to accurately generate an engine output in conformity to a required vehicle driving power, wherein starting/stopping and output of the engine 2 are controlled with reference to a state-of-charge (SOC) and a voltage of secondary battery, an engine efficiency map, etc. Just for reference, various parameters for use in the direct series control process are specifically shown in a block diagram of FIG. 3. An output of the generator is varied dependent on not only a required vehicle driving power but also a loss in a drive line, and a state of other system, such as a state of the secondary battery and an electric power consumption of auxiliary components. Further, a target generator torque is set in consideration of influence of disturbances, such as engine temperature and atmospheric pressure, and according to a feedback control based on a difference between a target generator speed and an actual generator speed.

As seen in FIG. 2, in this hybrid system of vehicle 1, an accelerator pedal angle (#11) corresponding to a depression amount of an accelerator pedal operated by a driver, and a current vehicle speed (#12) are detected, and the detected accelerator pedal angle and current vehicle speed are used as input values to a predetermined "speed↔torque" map (#13) representing a relationship between a vehicle speed and a motor torque, so as to determine a torque to be generated by the motor 6 (motor generation torque) (#14).

Then, the motor generation torque determined in #14 and a battery voltage detected separately (#15) are used as input values to a predetermined "torque↔current" map (#16) representing a relationship between a motor torque and a motor current, so as to determine a required motor current (#17).

After the motor generation torque is determined in #14, a motor speed is measured (#18) to determine a current vehicle speed. This current vehicle speed is relevant to the current vehicle speed in #12, and constantly determined to derive the motor generation torque. This current vehicle speed is used as an input value to a "speed↔voltage" map (#19) representing a relationship between a vehicle speed and a motor voltage, so as to determine a required motor voltage (#20).

Then, a required motor output is determined based on the required motor current determined in #17 and the required motor voltage determined in #20, and an engine speed is measured in #41. The required motor output and the engine speed are used as input values to an engine operating-point map (#21), so as to determine an absorption torque of the generator 3 (#22). This absorption torque corresponds to a torque at which an engine torque is equilibrated with a generator torque, as described later with reference to FIG. 4. Subsequently, a generator speed is determined (#23). Then, the generator 3 is operated to generate electric power based on the generator absorption torque and the generator speed, according to need (#24).

When a required motor output (#25) defined based on the required motor current determined in #17 and the required motor voltage determined in #20 has a relatively high value, an opening of a throttle valve (not shown) is adjusted (#29) based on a generator efficiency map (#26), an engine efficiency map (#27) and an engine output map (#28), to adjust an output of the engine 2 (#30). If the required motor output (#25) has a relatively low value, a fuel supply will be consequently cut (#37) to stop the engine 2 (#38) and set in an EV running mode where the motor 8 is driven based on only an electric power supplied from the battery 6 (#39).

Further, according to need, a motor-based charge/discharge control is performed (#32) in accordance with the required motor output (#25) defined based on the required motor current determined in #17 and the required motor voltage determined in #20.

Along with a charge/discharge control based on the generator 3 (#24) and the charge/discharge control based on the motor 8 (#32), a variation in state-of-charge (SOC) of the battery 6 is detected (#33), and a future SOC variation is estimated (#35) based on a current vehicle speed (#12) and a current acceleration/deceleration (#34). Then, based on the detection result in #33 and the estimation result in #35, it is determined whether the engine 2 should be operated (#36). Specifically, if it is estimated that the SOC will become less than a given threshold, the SOC is determined to be deficient. Thus, the engine 2 is started to accelerate the generator 3 (#40). After #40, an engine speed is measured (#41) to determine whether the measured engine speed is increased up to an allowable range (#42). If NG, the process will return to #40. When the measured engine speed is increased up to the allowable range, fuel injection and ignition in the engine 2 will be initiated (#43). Then, the acceleration of the generator 3 is discontinued (#44).

In #36, when it is estimated that the SOC will become greater than the given threshold, it is determined that the SOC is in an excess state, i.e., the engine 2 should be stopped. Thus, the fuel supply is cut (#37) to stop the engine 2 (#38) so as to achieve the EV running mode of the vehicle (#39).

As above, in this hybrid system of vehicle 1, the output of the engine 2 as a driving power source of the generator 3 can be accurately generated in conformity to a required vehicle driving power without the need for correcting electric power by the battery 6, to achieve stable vehicle running depending on the required vehicle driving power.

Figure 4:
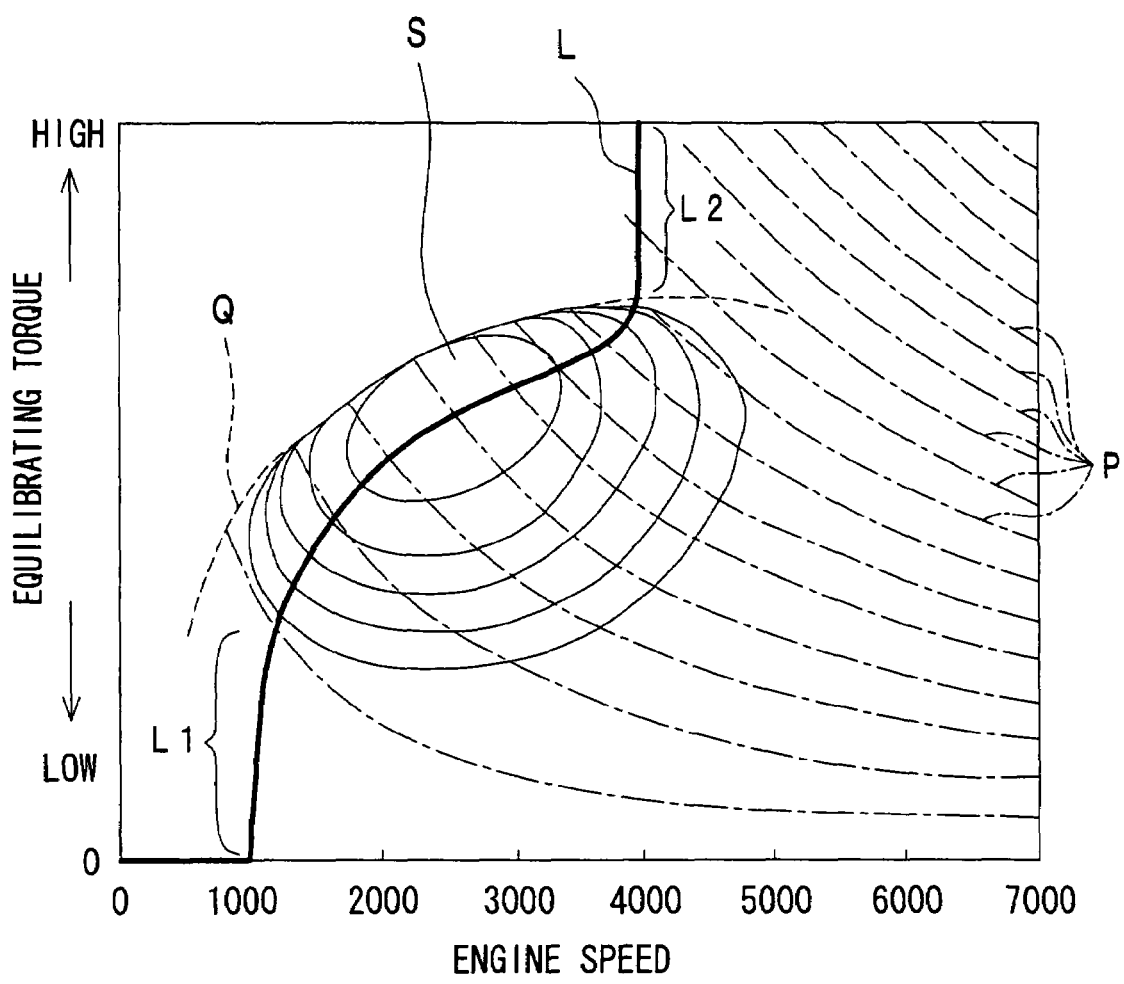
FIG. 4 is a graph having a horizontal axis representing an engine or generator speed, and a vertical axis representing a torque (hereinafter referred to as "equilibrating torque") at which an engine torque is equilibrated with a generator torque.

FIG. 4 is a graph having a horizontal axis representing a speed of the engine 2 (or the generator 3), and a vertical axis representing a torque (hereinafter referred to as "equilibrating torque") at which an engine torque is equilibrated with a generator torque. In this graph, the code P indicates a plurality of different required motor output lines (hereinafter referred to as "equi-output lines") determined using a parameter consisting of a load of the motor 8. The code Q indicates a maximum equilibrating torque line, and the code S indicates an approximately oval-shaped region and a plurality of strip-shaped regions surrounding the oval-shaped region, each of which represents a region having excellent combinational efficiency of the engine 2 and the generator 3, i.e., a high engine efficiency region where a product of a thermal efficiency of the engine 2 and a power generation efficiency of the generator 3 becomes equal to or greater than a given value. In this region, a more inner portion has a higher efficiency. A control line L is formed by connecting a part of respective intersection points between the equi-output lines P and the high efficiency region S in such a manner that each of the equilibrating torque and the engine speed becomes higher as the required motor output is increased. Particularly, the control line L in this embodiment is set as an envelope formed by connecting respective maximum efficiency points (i.e., points each having a maximum fuel efficiency (maximum fuel economy)) on the equi-output lines P. The target torque and the target speed of the generator 3 are set based on the required output of the generator 3 and the control line L.

In this embodiment, the control line L has a portion (indicated by the code L1 in FIG. 4) set such that the target torque of the generator 3 is rapidly reduced to zero as the engine speed is lowered in a given engine speed region less than those in the high engine efficiency region S. Further, in this embodiment, the control line L has a portion (indicated by the code L2 in FIG. 4) set such that the target torque of the generator 3 is rapidly increased as the engine speed is increased in a given equilibrating torque region greater than a maximum equilibrating torque in the high engine efficiency region S (i.e., in an equilibrating torque region above the maximum equilibrating torque line Q).

In the above manner, the respective torques and speeds of the generator 3 and the engine 2 are set based on the control line L on which each of the equilibrating torque and the engine speed is increased in response to an increase in load of the motor. Thus, the respective outputs of the generator 3 and the engine 2 can be accurately generated in conformity to the required motor output. In addition, the control line L is set as an envelope formed by connecting respective maximum efficiency points on the equi-output lines P. This makes it possible to run the vehicle with a maximum fuel efficiency so as to achieve enhanced fuel economy. Further, in a given low engine speed region where the engine 2 is likely to have unstable combustion, the target torque of the generator 3 is rapidly reduced to zero to allow the engine 2 to be stopped so as to suppress deterioration in fuel economy. In this case, during start of the engine 2, the entire torque generated by the engine 2 can be consumed in increasing the speed of the generator 3 to quickly activate the generator 3. Furthermore, in a given torque range greater than the maximum equilibrating torque in the high engine efficiency regions S (i.e., in a torque region above the maximum equilibrating torque line Q), the target torque of the generator 3 is rapidly increased as the engine speed is increased. This makes it possible to prevent the engine 2 and the generator 3 from being operated at an excessively high speed so as to ensure reliability thereof.

Figure 5:
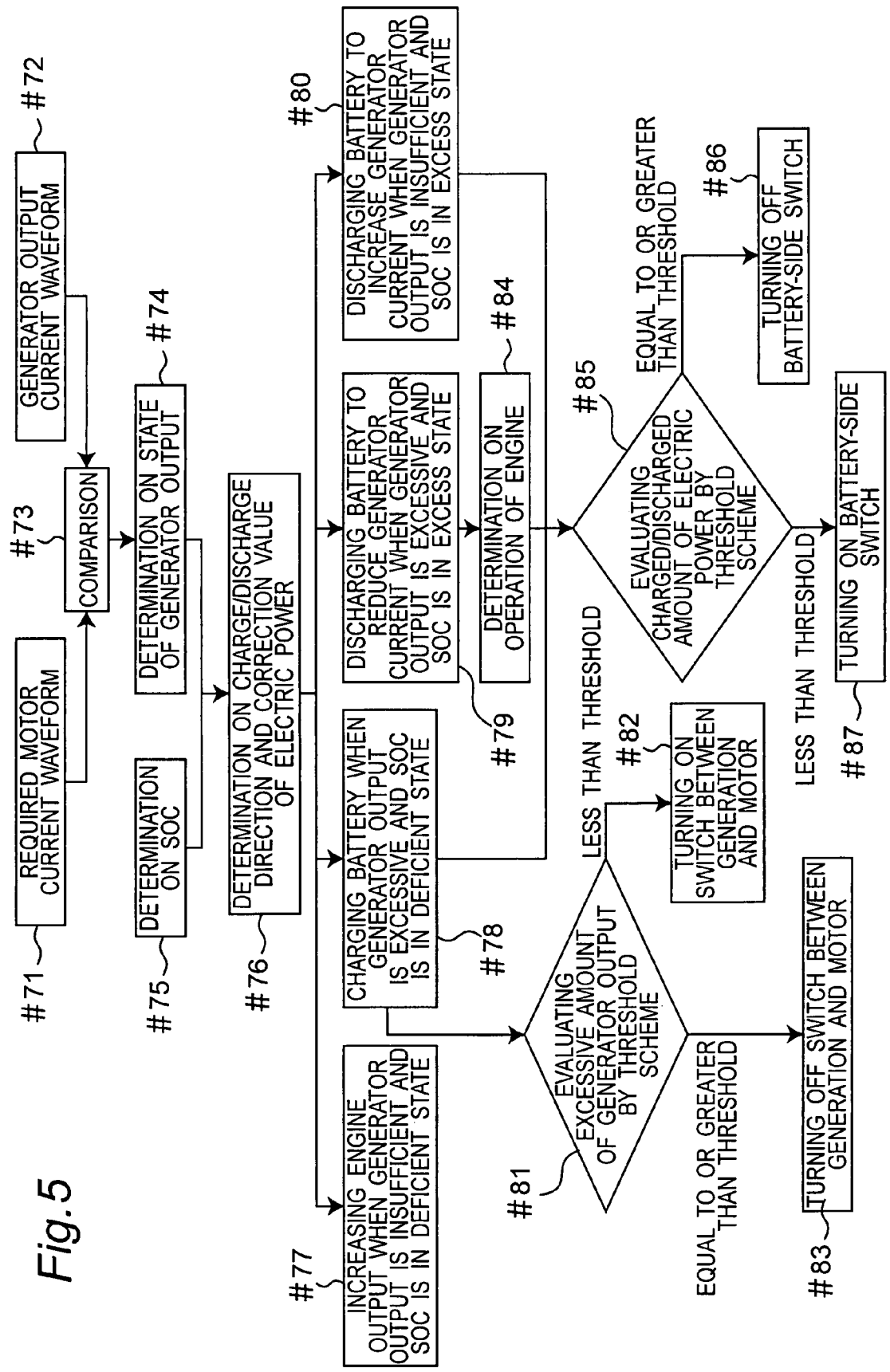
FIG. 5 is a flowchart showing a switching control process for a switching element provided between a generator and an electric motor and an internal switch provided between the generator and a battery, in the hybrid system of vehicle.

The technique for ensuring accuracy in conformity between the required motor output and the engine output has been described as above. In the hybrid system of vehicle 1 where the generator 3 is directly connected to the motor 8, the conformity between a required vehicle driving power and an output of the engine 2 can be adequately ensured in the normal vehicle running condition. On the other hand, for example, when a vehicle is started, or when a vehicle speed is rapidly changed, or when a vehicle is stopped on uphill while applying torque to the motor, it is difficult to adequately ensure the conformity. In this case, overshoot or undershoot occurs in the generator 3 due to delay in transient response of the engine output. In order to avoid adverse effects of the overshoot or undershoot, the hybrid system of vehicle 1 is designed to correct such overshoot or undershoot based on charging/discharging of the battery 6. The charging/discharging of the battery 6 is fundamentally performed by switching the internal switch 4a of the inverter 4 interposed between the generator 3 and the battery 6, and the switching element 7 interposed between the generator 3 and the motor 8. With reference to FIG. 5, a control process of switching the internal switch 4a and the switching element 7 while determining a vehicle running condition based on various criteria will be described.

A waveform of a required output current of the motor 8 (#71) is firstly compared (#73) with a waveform of a current generated by the generator 3 (#72) to determine overshoot or undershoot occurs in the generator 3 (#74). Then, based on this determination result, and a SOC (state-of-charge) of the battery 6 (#75), a charge/discharge direction and a correction value of electric power (an amount of electric power to be corrected) are determined (#76). The charge/discharge direction means a direction of a current for charging/discharging the battery 6. Specifically, when the SOC of the battery 6 is in a deficient state, a current is supplied in a direction for charging the battery 6. If the SOC of the battery 6 is in an excess state, a current will be supplied in a direction for discharging the battery 6.

After the charge/discharge direction and the correction value of electric power are determined, in a first condition where the output of the generator 3 is insufficient and the SOC of the battery 6 is in the deficient state, only the engine output is increased while maintaining a current state of the internal switch 4a and the switching element 7, i.e., without a switching control of the internal switch 4a and the switching element 7 (#77).

In a second condition where the output of the generator 3 is excessive and the SOC of the battery 6 is in the deficient state, an operation of charging the battery 6 is performed (#78). During this charging operation, the excessive amount of generator output is evaluated by a threshold scheme, i.e., it is determined whether the excessive amount of generator output is less than a given threshold (#81). If the excessive amount is less than the threshold, both the internal switch 4a of the inverter 4 and the switching element 7 between the generator 3 and motor 9 will be turned on (#82). When the excessive amount is equal to or greater than the threshold, the switching element 7 is turned off (#83).

In a third condition where the output of the generator 3 is excessive, and the SOC of the battery 6 is in the excess state, an operation of discharging the battery 6 is performed to supply a current in such a manner as to cancel or reduce a current generated by the generator 3 (#79). Then, it is determined whether the engine 2 should be operated (#84).

In a fourth condition where the output of the generator 3 is insufficient, and the SOC of the battery 6 is in the excess state, an operation of discharging the battery 6 is performed to supply a current in such a manner as to support or increase a current generated by the generator 3 (#80).

After #78, #80 and #84, a charged/discharged amount of electric power in the battery 6 is evaluated by a threshold scheme, i.e., it is determined whether the charged/discharged amount of electric power is less than a given threshold (#85). If the charged/discharged amount is equal to or greater than the threshold, the internal switch 4a of the inverter 4 will be turned off (#86). When the charged/discharged amount is less than the threshold, the internal switch 4a of the inverter 4 is turned on (#87).

As above, in this embodiment, the internal switch 4a and the switching element 7 are appropriately switched depending on various conditions for the output of the generator 3 and the SOC of the battery 6, so that the battery 6 can correct overshoot or undershoot which otherwise transiently occurs in the generator 3 due to delay in transient response of the engine output.

Although not included in FIG. 5 as a specific step, during power supply in a large amount, for example, during high-speed vehicle running, the switching operation of the internal switch 4a of the inverter 4 and the switching element 7 may be stopped to suppress deterioration in durability of contacts of the internal switch 4a and the switching element 7.

Further, when the SOC of the battery 6 is in the deficient state during vehicle stop or the like, a current generated by the generator 3 is partly supplied to the battery 6 through the inverter 4 and the converter 5 to charge the battery 6, while supplying the remaining current from the generator 3 to the motor 8. In this embodiment, with a view to suppressing an electric power loss on the side of the battery 6 during this operation, based on a commonly-known characteristic in which, when a small amplitude region (low current region) of a three-phase AC power (sine wave) generated by the generator 3 is supplied to the battery 6, the electric power loss on the side of the battery 6 is reduced even if a total area of the sine waveform (i.e., a total electric power) is kept constant, the sine wave is divided into a small amplitude region and a peak region, and the small amplitude region and the peak region are wave is supplied to the battery 6 and the motor 8, respectively.

FIG. 6A shows a waveform of a three-phase AC consisting of three sine-waves (U-wave, V-wave, W-wave) having a phase difference of $\pi/3$ with respect to each other, wherein the U-wave, the V-wave and the W-wave are indicated by solid line, dashed line and one-dot chain line, respectively. FIG. 6B shows a sin waveform of only the U-wave. FIGS. 6C, 6D and 6E show examples of division of the U-wave. While the following description will be made based on a processing for the U-wave, each of the V-wave and the W-wave is subjected to the same processing, and its description will be omitted.

As a common point among the two examples illustrated in FIGS. 6C to 6D, the U-wave is divided into a small amplitude region, i.e., positive/negative regions on both sides of a zero-crossing point (hereinafter referred to as "zero-crossing regions), and positive/negative peak regions, and the former regions and the latter regions are supplied to the battery 6 and the motor 8, respectively. This current supply operation is achieved by alternately turning on the internal switch 4a of the inverter 4 and the switching element 7. More specifically, an electric power transmission to the battery 6 is achieved by turning on the internal switch 4a and turning off the switching element 7, and an electric power transmission to the motor 8 is achieved by turning off the internal switch 4a and turning on the switching element 7. In the two examples illustrated in FIGS. 6C and 6D, the timing of switching the internal switch 4a and the switching element 7 is different from each other. Specifically, in the example illustrated in FIG. 6C, larger positive/negative currents will be supplied to the motor 8 as compared with the example illustrated in FIG. 6D.

The above switching control is performed by turning on one of the internal switch 4a of the inverter 4 and the switching element 7, and turning off the other. Alternatively, the U-wave can also be divided by turning on/off the internal switch 4a of the inverter 4 while maintaining the switching element 7 in its ON state. The waveform illustrated in FIG. 6E corresponds to a result of this switching control.

In this switching control, electric power is supplied to the motor 8 when the internal switch 4a of the inverter 4 is turned off. When the internal switch 4a of the inverter 4 is turned on, a current is supplied to the battery 6 according to an inductance ratio between the battery-side and the motor-side. That is, a small current also flows toward the motor 8. A decrement in current during current supply to the battery 6 is equivalent to an amount of current flowing toward the motor 8, and the amount of current is dependent on an inductance determined by a motor coil and a motor speed at that time.

As above, the internal switch 4a and the switching element 7 are switched in such a manner that the generator 3 is connected to the battery 6 only within a given time period around the zero-crossing point along the AC waveform except for the positive and negative peak regions in one AC cycle, i.e., only in a low current region. This makes it possible to charge the battery while suppressing deterioration in durability of each switching means.

An advantageous embodiment of the present invention has been shown and described. It is obvious to those skilled in the art that various changes and modifications may be made therein without departing from the spirit and scope of the invention.

What is claimed is:

1. A hybrid system of vehicle designed to drive a generator by an engine and supply an electric power generated by said generator directly to a wheel-driving electric motor so as to drive said motor, comprising:

required motor output setting means for setting a required output of said motor depending on a required vehicle driving power;

required generator output setting means for setting a required output of said generator depending on said required motor output set by said required motor output setting means;

engine output setting means for setting an output of said engine depending on said required generator output set by said required generator output setting means;

a battery connected to said generator through an inverter and a converter;

first switching means for switching electrical connection between said generator and said battery;

second switching means for switching electrical connection between said generator and said motor; and switching control means for controlling said first and second switching means to allow electric power to be supplied from said battery to said motor and to allow said battery to be charged by said generator;

wherein said switching control means is operable, when said battery is charged by said generator, to control said first and second switching means in such a manner that said generator is connected to said battery within a given time period around a zero-crossing point along an AC waveform except for positive and negative peak regions in one AC cycle.

2. The hybrid system of vehicle as defined in claim 1, further comprises:

target generator value setting means operable to set a target torque and a target speed of said generator, based on said required generator output set by said required generator output setting means, and wherein after setting a control line which is formed by connecting a part of respective intersection points between a plurality of required motor output lines each representing a change in the required motor output determined using a parameter including a load of said motor, and a high engine efficiency region where a product of a thermal efficiency of said engine and a power generation efficiency of said generator becomes equal to or greater than a given value, in such a manner that each of an engine or generator speed and an equilibrating torque at which an engine torque is equilibrated with a generator torque, becomes higher as the required motor output is increased, the target torque and the target speed of the generator is set based on the required generator output set by the required generator output setting means.

3. The hybrid system of vehicle as defined in claim 2, wherein said target generator value setting means is operable to select maximum efficiency points from respective intersection points between said plurality of required motor output lines and said high engine efficiency region, and connect said selected maximum efficiency points on equi-output lines consisting of said plurality of required motor output lines to form an envelope serving as said control line.

4. The hybrid system of vehicle as defined in claim 2, wherein said target generator value setting means is operable to set said control line to have a portion where the target torque of said generator is rapidly reduced to zero as the engine or generator speed is lowered in a given engine or generator speed region less than those in the high engine efficiency region.

5. The hybrid system of vehicle as defined in claim 2, wherein said target generator value setting means is operable to set said control line to have a portion where the target torque of said generator is rapidly increased as the engine or generator speed is increased in a given equilibrating torque region greater than a maximum equilibrating torque in said high engine efficiency region.

6. The hybrid system of vehicle as defined in claim 1, wherein said switching control means is operable, when the electric power is supplied from said battery to said motor at a given value or more, to stop a switching operation of said first and second switching means.

7. The hybrid system of a vehicle as defined in claim 1, wherein said switching control means control said first and second switching means in such a manner that said generator and said motor are connected to each other within the given time period around the positive or negative peak region except for the zero-crossing point in one AC cycle.

8. The hybrid system of a vehicle as defined in claim 7, wherein said switching control means controls said first and second switching means in such a manner that within the given time period around the zero-crossing point except for the positive or negative peak region in one AC cycle, said first switching means is set to the ON state and said second switching means is set to the OFF state so that the electric power of said generator is supplied to said battery, while within the given time around the positive or negative peak region except for the zero-crossing point, said first switching means is set to the OFF state, and second switching means is set to the ON state so that the electrical power of said generator is supplied to said motor.

9. The hybrid system of a vehicle as defined in claim 7, wherein said switch control means controls said first and second switching means in such manner that said second switching means is always set to the ON state, and within the given time period around the zero-crossing point except for the positive or negative peak region in one AC cycle, said first switching means is set to the ON state so that the electric power of said generator is supplied to each of said battery and said motor according to an inductance ratio between the battery-side and the motor-side, while within the given time period around the positive or negative peak region except for the zero-crossing point, said first switching means is set to the OFF state so that the electric power of said generator is supplied to said motor.

* * * * *